United States Patent
Walsh et al.

(10) Patent No.: US 11,606,512 B2
(45) Date of Patent: Mar. 14, 2023

(54) SYSTEM AND METHOD FOR ROBUST MODEL-BASED CAMERA TRACKING AND IMAGE OCCLUSION REMOVAL

(71) Applicant: Disney Enterprises, Inc., Burbank, CA (US)

(72) Inventors: Peter Walsh, Burbank, CA (US); Jayadas Devassy, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 335 days.

(21) Appl. No.: 17/032,604

(22) Filed: Sep. 25, 2020

(65) Prior Publication Data
US 2022/0103764 A1    Mar. 31, 2022

(51) Int. Cl.
*H04N 5/272*    (2006.01)
*G06T 7/77*    (2017.01)

(52) U.S. Cl.
CPC .............. *H04N 5/272* (2013.01); *G06T 7/77* (2017.01); *G06T 2207/10016* (2013.01); *G06T 2207/20081* (2013.01); *G06T 2207/30228* (2013.01)

(58) Field of Classification Search
CPC ... G06T 7/77; G06T 7/80; G06T 2207/30244; G06T 7/73; G06T 7/75; G06T 7/70; G06T 2207/30228; G06T 2207/30221; G06T 2207/20081; G06T 2207/20084; G06T 2207/10016; G06T 7/579; G06V 20/42; G06V 10/26; G06V 10/273; G06V 10/454; G06V 10/70; G06V 10/82; G06N 3/02;

(Continued)

(56) References Cited

U.S. PATENT DOCUMENTS 5,264,933 A    11/1993 Rosser et al.
2020/0311540 A1*    10/2020 Chakraborty ....... G06F 21/6227

(Continued)

OTHER PUBLICATIONS

Chen et al. "Sports camera calibration via synthetic data," Proceedings of the IEEE/CVF conference on computer vision and pattern recognition workshops (Year: 2019).*

(Continued)

*Primary Examiner* — Siamak Harandi
*Assistant Examiner* — Michael Adam Shariff
(74) *Attorney, Agent, or Firm* — McCormick, Paulding & Huber PLLC

(57) ABSTRACT

A system and method for model-based camera tracking and image occlusion removal for a camera viewing a sports field (or other scene) includes receiving a synthesized data set comprising at least one empty field image of the field, the empty field image with at least one occlusion graphic, and camera parameters corresponding to the empty field image, training a neural network model to estimate the empty field image and the corresponding camera parameters by providing the model with an input training image comprising the empty field image with occlusion graphic, and providing the model with model output targets comprising the empty field image and the corresponding camera parameters as targets for the model, receiving by the neural network model, alive input image comprising a view of the field with live occlusions, and providing by the neural network model, using trained model parameters, estimated live camera parameters or an estimated empty field image associated with the live input image.

21 Claims, 16 Drawing Sheets

(58) Field of Classification Search
CPC .......... G06N 20/00; G06N 3/08; G06N 3/084; H04N 5/272
See application file for complete search history.

(56) References Cited

U.S. PATENT DOCUMENTS

| | | | |
|---|---|---|---|
| 2020/0342652 A1* | 10/2020 | Rowell | G06T 7/75 |
| 2022/0067994 A1* | 3/2022 | Neuberger | G06N 3/0454 |
| 2022/0084653 A1* | 3/2022 | Yang | A61C 9/0053 |
| 2022/0319034 A1* | 10/2022 | Fan | H04N 7/147 |

OTHER PUBLICATIONS

Nicholson, Chris, "A Beginner's Guide to Important Topics in AI, Machine Learning, and Deep Learning.", Pathmind Inc. (https://pathmind.com), 2020.
Saha, Sumit, "A Comprehensive Guide to Convolutional Neural Networks—the ELI5 way", Towards Data Science, Dec. 15, 2018.
Chen, Jianhui, et al., "Sports Camera Calibration via Synthetic Data", arXiv:1810.10658v1, [cs.CV], Oct. 25, 2018.
"Fully Connected Layers in Convolutional Neural Networks: The Complete Guide", Convolutional Neural Networks, https://missinglink.ai/guides/convolutional-neural-networks/fully-connected-layers-convolutional-neuralnetworks-complete-guide/.

* cited by examiner

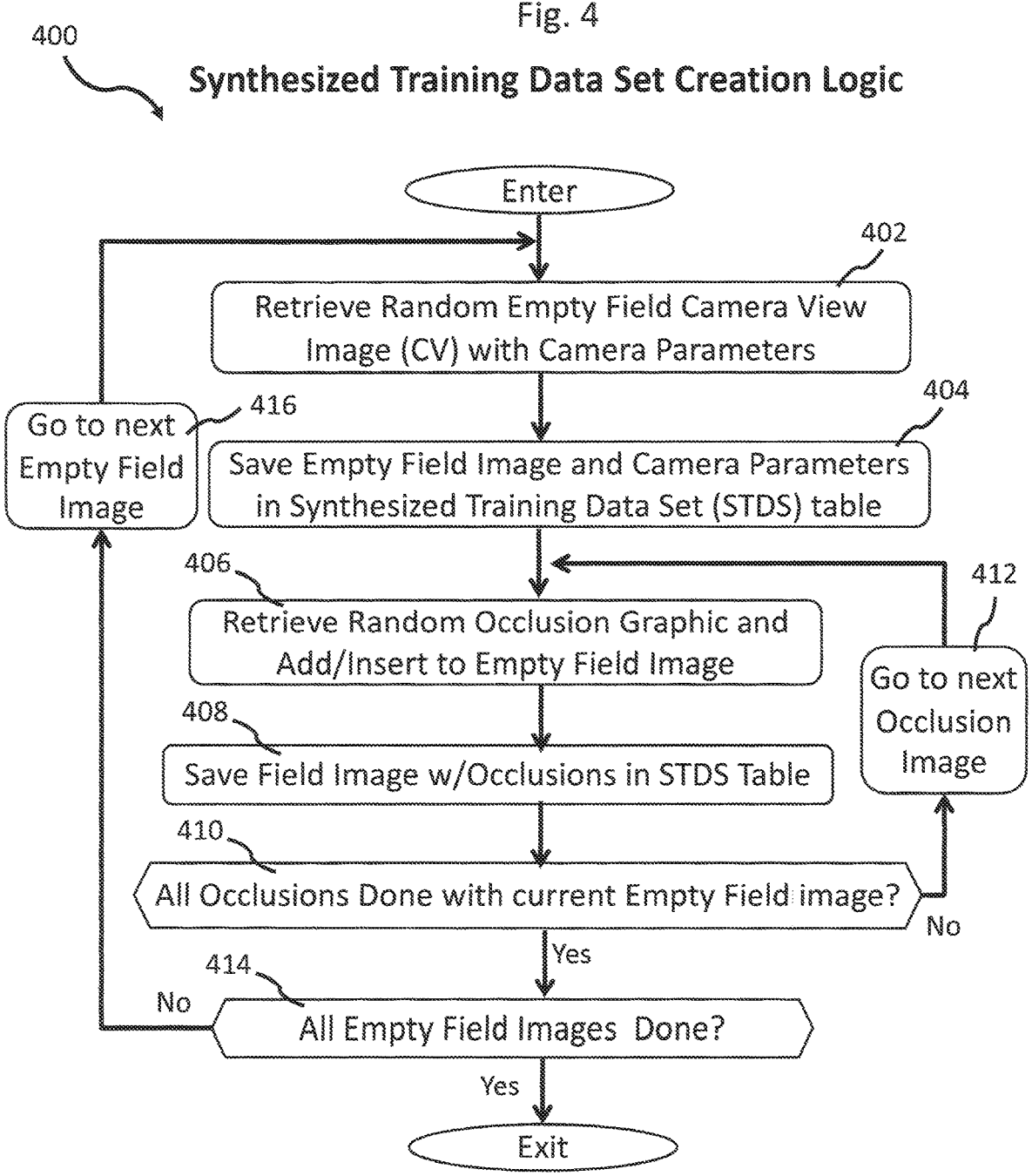

Random Synthetic Empty Field Images Table

| Empty Field Camera View Image # | Empty Field CV Image Name | Empty Field CV Image File Name | Camera Parameters (P1-P7) |
|---|---|---|---|
| 1 | CV1 | CV1.png | P1-1 to P7-1 |
| 2 | CV2 | CV2.png | P1-2 to P7-2 |
| 3 | CV3 | CV3.png | P1-3 to P7-3 |
| 4 | CV4 | CV4.png | P1-4 to P7-4 |
| *** | *** | *** | *** |
| M | CVM | CVM.png | P1-M to P7-M |

Random Synthetic Occlusion Graphic Table

| Occlusion Graphic # | Occlusion Graphic Image Name | Occlusion Graphic File Name | Description |
|---|---|---|---|
| 1 | OG1 | OG1.png | Occlusion Graphic Image 1 |
| 2 | OG2 | OG2.png | Occlusion Graphic Image 2 |
| 3 | OG3 | OG3.png | Occlusion Graphic Image 3 |
| 4 | OG4 | OG4.png | Occlusion Graphic Image 4 |
| *** | *** | *** | *** |
| N | OGN | OGN.png | Occlusion Graphic Image N |

Fig. 5C

Synthesized Training Data Set Table (550)

| Camera View (CV) # | Empty Field (EF) Image Name | Camera Params for Camera View | Added Occlusion Graphic Image Name | Field with Occlusion Graphic Image Name |
|---|---|---|---|---|
| 1 | CV1 | P1-1 to P7-1 | N/A | N/A |
| 1 | CV1 | P1-1 to P7-1 | OG1-1 | CV1-OG1-1 |
| 1 | CV1 | P1-1 to P7-1 | OG2-1 | CV1-OG2-1 |
| ... | ... | ... | ... (other occlusions) | ... (CV1 w/other occlusions) |
| 1 | CV1 | P1-1 to P7-1 | OGN-1 | CV1-OGN-1 |
| 2 | CV2 | P1-2 to P7-2 | N/A | N/A |
| 2 | CV2 | P1-2 to P7-2 | OG1-2 | CV2-OG1-2 |
| 2 | CV2 | P1-2 to P7-2 | OG2-2 | CV2-OG2-2 |
| ... | ... | ... | ... (other occlusions) | ... (CV2 w/other occlusions) |
| 2 | CV2 | P1-2 to P7-2 | OGN-2 | CV2-OGN-2 |
| 3 | CV3 | P1-3 to P7-3 | N/A | N/A |
| 3 | CV3 | P1-3 to P7-3 | OG1-3 | CV3-OG1-3 |
| 3 | CV3 | P1-3 to P7-3 | OG2-3 | CV3-OG2-3 |
| ... | ... | ... | ... (other occlusions) | ... (CV3 w/other occlusions) |
| 3 | CV3 | P1-3 to P7-3 | OGN-3 | CV3- OGN-3 |
| ... (other views) | ... (other EF Images) | ... (other Camera Params) | ... (other occlusions) | ... (other EFs w/occlusions) |
| M | CVM | P1-M to P7-M | N/A | N/A |
| M | CVM | P1-M to P7-M | OG1-M | CVM-OG1-M |
| M | CVM | P1-M to P7-M | OG2-M | CVM-OG2-M |
| ... | ... | ... | ... (other occlusions) | ... (CVM w/other occlusions) |
| M | CVM | P1-M to P7-M | OGN-M | CVM-OGN-M |

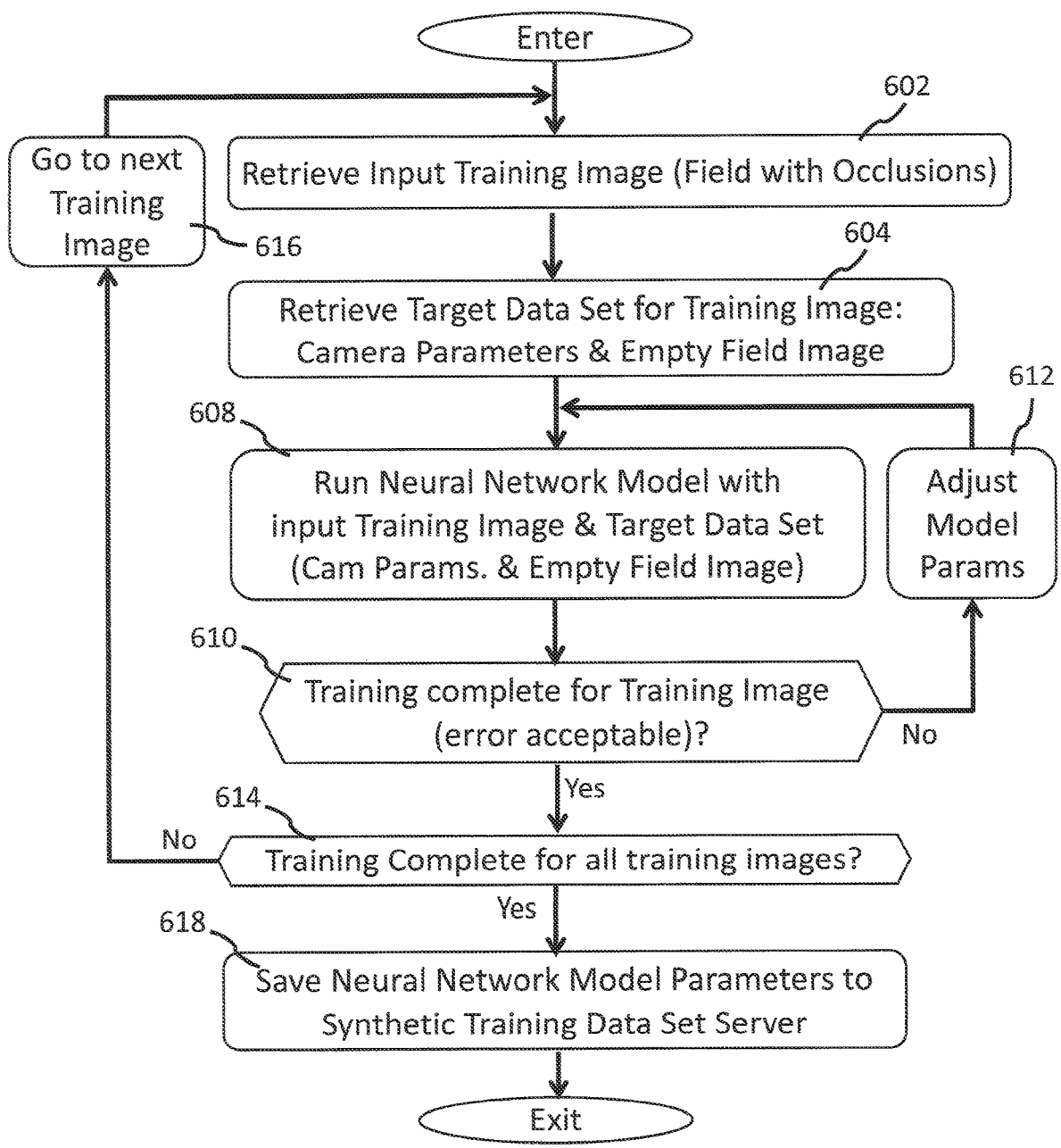

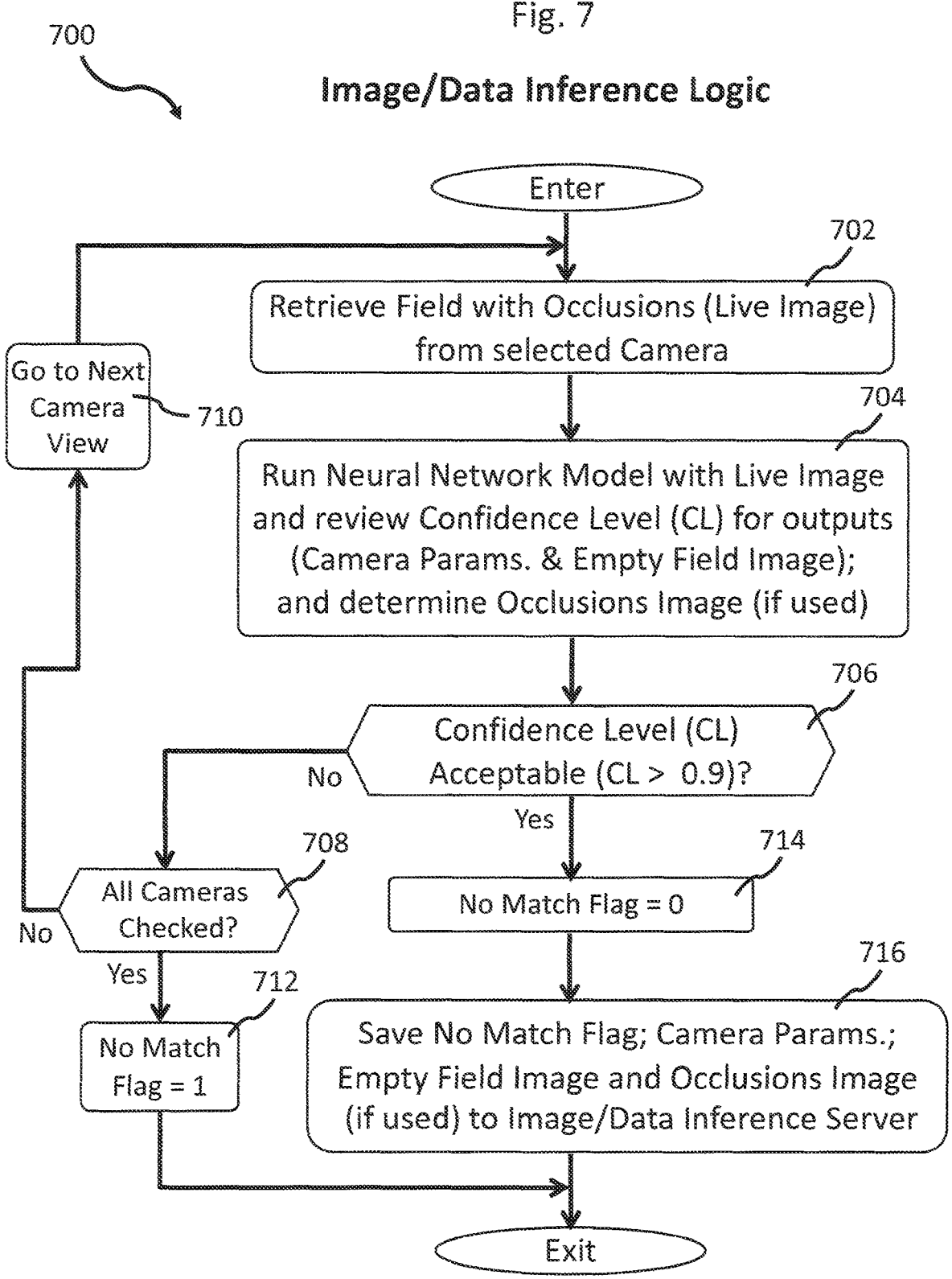

Fig. 8

Training Data Set Table 800

| Camera View (CV) # | Empty Field CV Image Name | Empty Field Image File Name | Camera Parameters ||||||| 
| | | | Location ||| Orientation ||| |
| | | | P1 | P2 | P3 | P4 | P5 | P6 | P7 |
| | | | X | Y | Z | Elevation (theta-x) | Roll (theta-y) | Azimuth (theta-z) | Field of View (fov) |
|---|---|---|---|---|---|---|---|---|---|
| 1 | CV1 | CV1.png | -0.672112167 | 0.420623183 | 0.177266955 | -0.78955996 | 0.005227923 | -0.009985447 | -0.723236561 |
| 2 | CV2 | CV2.png | 0.06054306 | 0.406338096 | 0.189124942 | -0.918362319 | -0.007337272 | -0.213358998 | -0.267017365 |
| 3 | CV3 | CV3.png | 0.43641448 | 0.568794489 | 0.238614202 | -0.929188848 | -0.002057493 | -0.207428753 | -0.196833372 |
| 4 | CV4 | CV4.png | 0.035594702 | 0.415367126 | 0.124226928 | -0.514116406 | 0.005522132 | 0.207253933 | -0.141653538 |
| 5 | CV5 | CV5.png | -0.511303127 | 0.425106883 | 0.212124825 | -0.596899033 | -0.004514158 | 0.058448076 | -0.41457653 |
| 6 | CV6 | CV6.png | -0.232987285 | 0.481394529 | 0.135652781 | -0.854304612 | 0.003928304 | -0.012171865 | -0.718359232 |
| 7 | CV7 | CV7.png | -0.063846827 | 0.616979241 | 0.102389216 | -0.763866186 | -0.000783443 | 0.028408408 | -0.697933793 |
| 8 | CV8 | CV8.png | 0.169819236 | 0.432395458 | 0.280001163 | -0.84792465 | 0.005206704 | -0.029360712 | -0.259697735 |
| 9 | CV9 | CV9.png | 0.393874168 | 0.396676898 | 0.282100916 | -0.736735523 | 0.010992408 | 0.162028909 | -0.247276306 |
| 10 | CV10 | CV10.png | -0.236154497 | 0.594565868 | 0.270625472 | -0.88756156 | 0.000368714 | 0.054827809 | -0.675635934 |
| 11 | CV11 | CV11.png | -0.065170288 | 0.427301407 | 0.238314033 | -0.590429068 | -0.00453037 | 0.172978401 | -0.25430578 |

Fig. 11
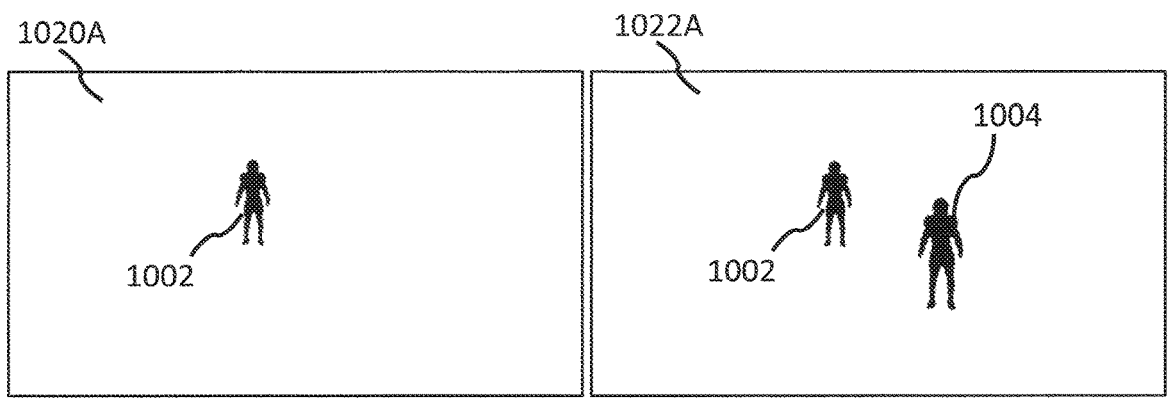
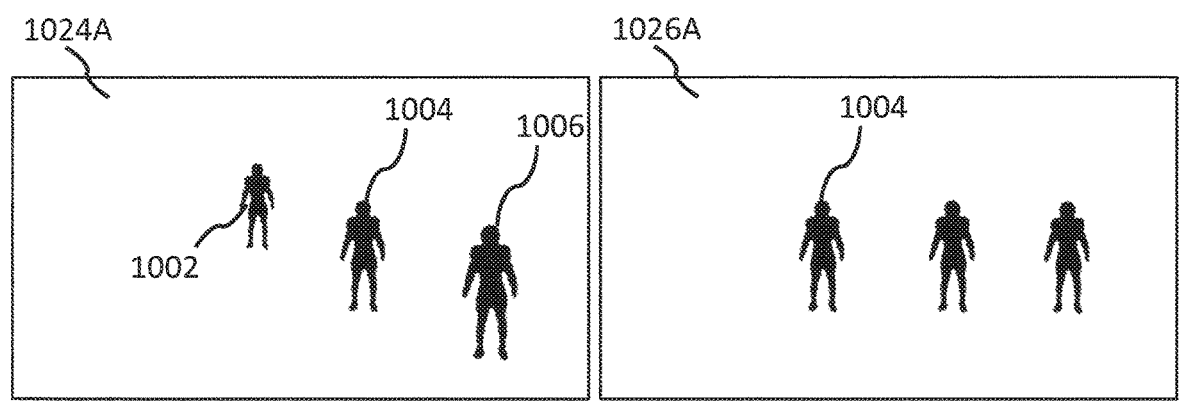
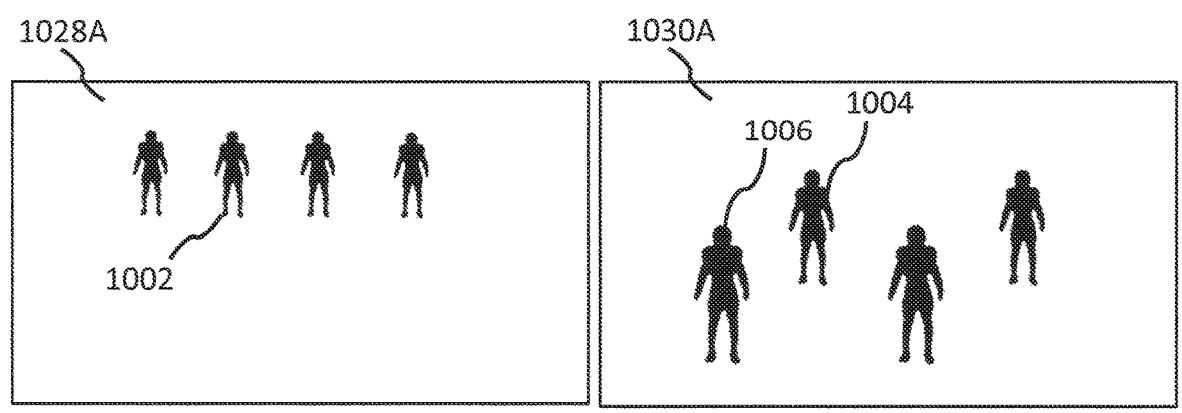

SYSTEM AND METHOD FOR ROBUST MODEL-BASED CAMERA TRACKING AND IMAGE OCCLUSION REMOVAL

BACKGROUND

Many activities in broadcast and video production operations involve graphic insertion into moving video, each of which requires some form of camera tracking. Applications include broadcast enhancements for sports and other video productions. Types of graphic insertions include: live insertion; replay/post-production insertions; and, more recently, augmented reality insertions. All of these graphic insertions require an accurate model of the image formation process which can then be used with the generation of 3D graphics for insertion into the moving video. A spatially and temporally accurate model of the image formation process is necessary in order to match the insertion graphics to an actual scene with the required fidelity.

Previous solutions have included the use of: (i) electronic instrumentation on camera heads, lenses, and jibs; (ii) computer vision based video analysis, which utilizes explicit searches for known visual features; and (iii) video analysis in the context of augmented reality, which typically uses video analysis to find natural or artificial landmarks together with the use of inertial and magnetic sensors.

However, each of these camera tracking techniques have shortcomings. In particular, the instrumented camera approach requires a detailed calibration procedure to estimate the non-instrumented parameters, and requires on-site hardware set-up, support, and calibration requirements, and is very sensitive to vibration. The computer vision approach relies on locating specified features in a video frame for use in determining the camera's pose (the camera model), which results in a "fragile" solution that is highly sensitive to partial occlusions and blur, and also requires a pre-broadcast or pre-production calibration procedure.

The augmented reality approach to camera tracking uses physical markers inserted into the scene to identify, or combining natural landmarks with an inertial and magnetic sensor. However, such augmented reality approaches do not provide absolute positioning, can be subject to drift, poor accuracy, and poor repeatability, and also generally require an initialization/calibration process.

Accordingly, it would be desirable to have a system and method that overcomes the shortcomings of the prior art and provides an accurate and robust camera tracking approach for graphics insertion into moving video.

BRIEF DESCRIPTION OF THE DRAWINGS

FIG. 4 is a flow diagram of a synthesized training data set creation logic, in accordance with embodiments of the present disclosure.

FIG. 5A is a table showing a random synthetic empty field images table, in accordance with embodiments of the present disclosure.

FIG. 5B is a table showing a random synthetic occlusion graphic table, in accordance with embodiments of the present disclosure.

FIG. 5C is a table showing a random synthesized training data set table, in accordance with embodiments of the present disclosure.

FIG. 6 is a flow diagram of a Neural Network Model Training Logic, in accordance with embodiments of the present disclosure.

FIG. 7 is a flow diagram of an Image/Data Inference Logic, in accordance with embodiments of the present disclosure.

FIG. 8 is a table showing sample camera parameter values corresponding to a plurality of different Empty Field camera views for the random Synthesized Training Data Set (STDS) table, in accordance with embodiments of the present disclosure.

FIG. 11 shows the images of FIG. 10 with the different occlusion graphics and the background field removed, in accordance with embodiments of the present disclosure.

DETAILED DESCRIPTION

Figure 1A:
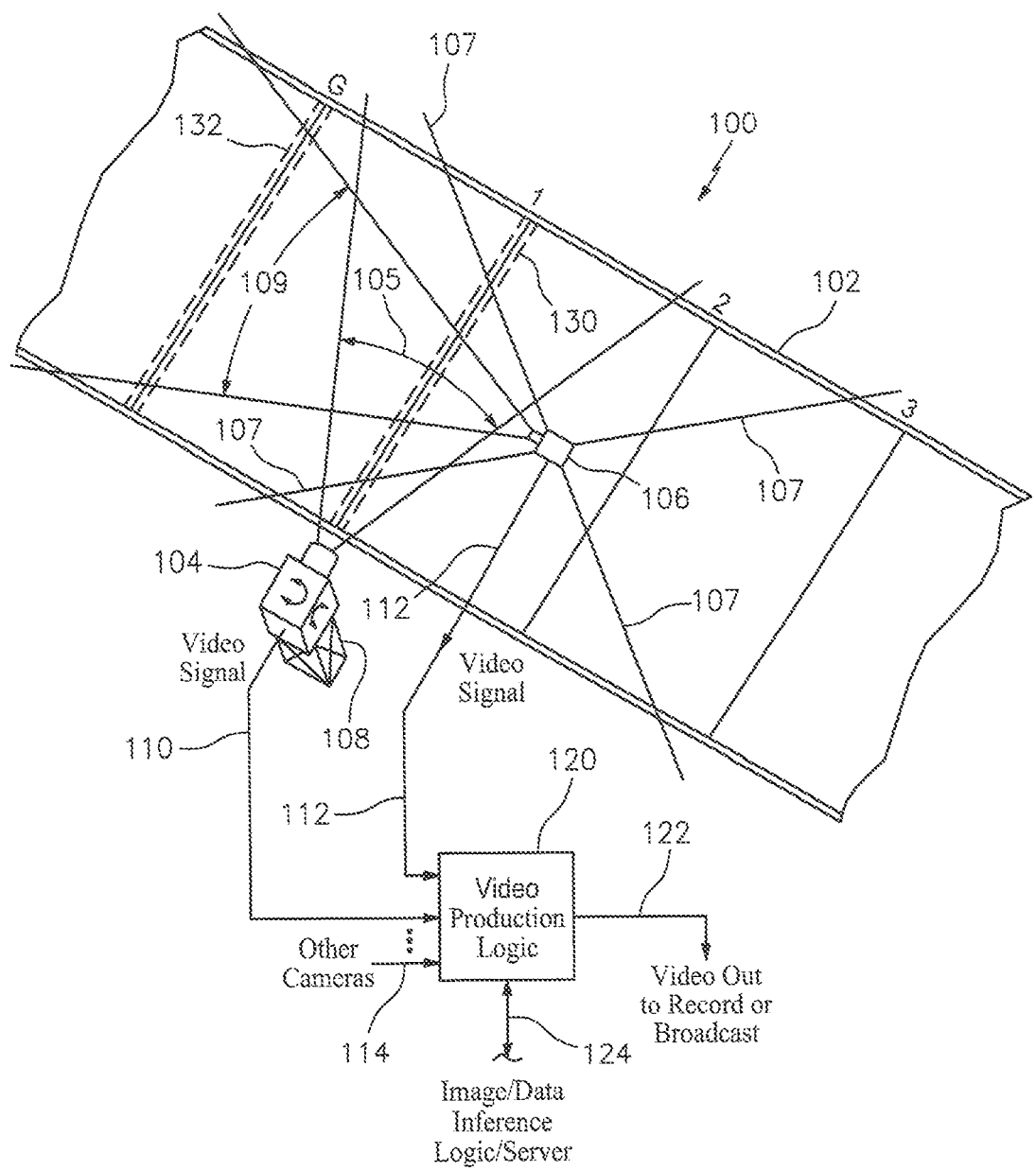
FIG. 1A is an aerial view of a sports playing field showing two cameras providing two different views of the field, in accordance with embodiments of the present disclosure.
Figure 1B:
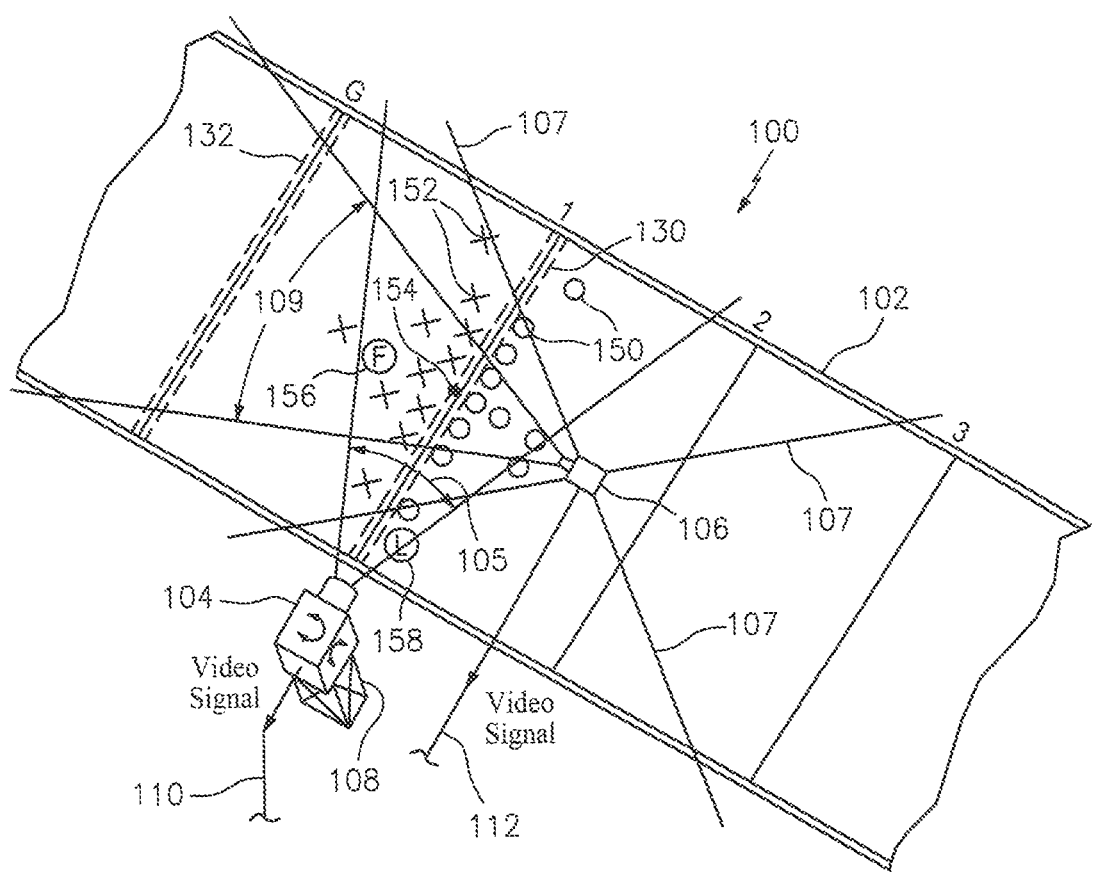
FIG. 1B is the diagram of FIG. 1A with occlusions (players) on the field that partially block the cameras' view of the field, in accordance with embodiments of the present disclosure.

As discussed in more detail below, in some embodiments, the system and method of the present disclosure provide robust model-based camera tracking and image occlusion removal, which enables accurate insertion of desired graphics into each image frame of moving video, among other benefits. The system and method of the present disclosure perform machine learning-based video analysis of a single frame of video and recognize what is being viewed and from what perspective. This recognition produces the exact camera model for the image formation process. The approach of the present disclosure does not require instrumentation and is robust. In particular, it utilizes all of the information (or pixels) in each frame of video to compute the camera model and is not dependent on finding specific features (or groups of pixels) within the image. The use of redundant information makes the technique of the present disclosure very robust.

The system and method of the present disclosure uses supervised machine learning to train an artificial neural network to create a mapping directly from image space to the parameter space of a camera model, and utilizes recent advances in deep learning for neural networks. From each frame of a video sequence, the present disclosure creates an accurate estimate of the camera parameters, which defines the image formation process for that frame. This estimate is a mapping of all data (or pixels) in the video image frame to the camera model parameter space, thereby utilizing a significant amount of redundant data. Such utilization of redundant data provides a high degree of robustness which has never been previously achieved.

The system and method of the present disclosure does not require instrumentation, it works on any video stream (that provides images capable of being trained using the models described herein), it is not "fragile" (i.e., it is not dependent on finding specific features or landmarks in a frame of video), and it uses all of the information (or data or pixels) in each image frame of video, which provides redundancy making it very robust. In some embodiments, the present disclosure may use less than all the pixels in the image frame, provided the number of pixels used provides the desired level of granularity, accuracy, redundancy, function or performance.

The present disclosure uses a deep machine learning methodology, which requires a very large data set (i.e., big data) to achieve the required level of performance and to accurately "generalize" (or approximate) when viewing a unique (or novel) view of a scene (one that does not exactly match the training set). A sufficiently large data set is not typically obtainable or available using a physical camera. Instead, the present disclosure uses computer generated (or synthesized) graphics to simulate various camera image views. The synthesis of these views utilizes an accurate representation of the full image formation process.

Thus, the system and method of the present disclosure is very robust and can estimate the camera's pose (camera parameters) from a single frame of video. It is robust due to its inherent use of redundant data and avoiding dependency on finding specific visual features/landmarks in the image. It provides accurate, fast estimation of the image formation process (camera model) for conditions under which the prior solutions fail.

The neural network model associated with the present disclosure has a unique design and structure which was created specifically to address the problem of identifying camera parameters associated with a scene having occlusions blocking portions of the scene. The model of the present disclosure uses training data comprised of a large number of synthesized (or computer generated) views of a scene (e.g., a sports playing field) with many randomly varying occlusions or occluding objects (e.g., players, referees/officials, sports objects (balls, pucks, sticks, bats, other sports equipment, and the like), fans/spectators, and the like) for every view of the scene.

Thus, the present disclosure may be used with real-time actual (live) broadcast conditions for the input images without requiring any prior information about the camera parameters such as camera location or other camera parameters. Conditions in such an actual broadcast environment may include widely varying camera locations, camera orientations, fixed and handheld cameras, lenses with a wide range of focal lengths, lenses with significant optical distortion, strongly varying illumination conditions and a lack of consistency in color and appearance. The present disclosure provides camera parameters, including: location (in 3D, X, Y, Z), camera orientation (in 3D, elevation, roll, azimuth), field-of-view (fov) or focal length, and optionally can also provide radial and tangential distortion, which can be significant with lenses in typical broadcast video cameras, and can also include varying illumination and inconsistent color and appearance.

As used herein, the term "scene" or "field" may refer to what the camera is viewing without occlusions present. Thus, a "scene" may be defined as the "background", which in the case of sports, may be a playing field, as it would appear without any occluding objects present. The objective of the machine learning neural network training is to learn the association of the camera parameters (intrinsic and extrinsic) with every image view of the scene. The network learns (through training on the training data set) the association for both training views of the scene, and also learns to "generalize" (or approximate) to provide a generalized output when there is a novel or live image that does not match the training set model.

The network is trained to "not see" (or ignore) the occlusions, i.e., to not be adversely affected by the presence of occlusions. Training uses synthesized views, using computer graphics generation, which are created over a large set of (e.g., more than a million) randomly generated camera parameters combined with randomly generated occlusions. For this training data in which the synthesized camera views contain occlusions, a form of Generative Adversarial Network (GAN) which includes a special purpose image decoder (or generator or regenerator) is trained and used to "regenerate" the scene (or field) as it would appear without the occlusions. This regeneration of the scene without occlusions (i.e., an empty field image), plays a major role in the training of the network, in learning the association between camera parameters and viewed scenes independent of any occlusions.

In some embodiments, the supervised machine learning neural network model training process of the present disclosure provides two outputs: (i) camera parameters (external and internal) and (ii) an image of the field (background) without occlusions (empty field). The image without occlusions is generated by the Generative Adversarial Network (GAN), which includes a special purpose image decoder (or generator or regenerator), described further herein, in which the occlusions have been removed, and intelligently "filled-in" to recreate the scene or empty field. The network, during training, learns to ignore the occluding objects on the field, as it generates an empty field image (image without occlusions). In some embodiments, a "cost function" (or error minimization function) is used by the supervised machine learning optimization model to combine the costs (or errors from target values) associated with the two outputs.

The image without occlusions (generated by the GAN), along with the input image, directly provides separation (or segmentation) of foreground and background images including the "intelligent fill" of the background in the areas where the foreground object(s) have been removed. These results come directly from the trained neural network. Such separation (or segmentation) of foreground and background images (or image planes or layers) by the present disclosure does not require any chromakeying, semantic segmentation or other methods that might otherwise be used to achieve a similar effect. Thus, the present disclosure is able to remove occlusions and regenerate (using the GAN) the underlying field or scene. The present disclosure can also separate out the occlusions as a separate output if desired. This result would allow the creation of a "layered" segmentation of the image which can be leveraged for such purposes as the selective insertion of graphics or the analysis of isolated activity in the scene.

The results or outputs from the neural network model can then be used in a number of ways, such as for graphic insertion on the background empty field, such as line of scrimmage and first down markers (football), virtual score boards or advertisements, object tracking (e.g., players, referees/officials, balls/equipment/sports objects, and the like) including advanced analytics of player activity. While the present disclosure may be used with sports fields having occlusions, it may be used with any scene viewed by a camera where occlusions (or occluding objects) block portions of the scene from the camera.

Accordingly, the present disclosure provides a unique (i) machine learning neural network model structure or approach, (ii) training method or technique, and (iii) synthesized training data set (which includes the generated images described above), which together provide an efficient and low cost approach to allow for accurate graphics insertion into to broadcast video and other benefits.

The present disclosure performs image processing using a machine learning model to create binary or grayscale images based on overall image content (holistic approach), as opposed to using image analysis or computer vision techniques of the prior art.

The present disclosure approach is capable of working across multiple sports and fields of play or playing courts. Also, the present disclosure is capable of handling full 3D environments, as there is no restriction to use of 2 dimensional features to accommodate use of homographies or the like.

Referring to FIG. 1A, an aerial view 100 of a football field 102 is provided with a known sideline video camera 104 having a field of view 105 and a known suspended on-field camera 106 (e.g., a Skycam®, or the like) having a field of view 109. The sideline video camera 104 may be a stationary camera mounted to a stationary or movable stand (or tripod) 108 or held by a person and capable of moving along the sidelines of the field of play 102. The Skycam 106 may be a suspended by cables 107, and be a computer-controlled system, which is moved through three dimensions in the open space over a playing area of a stadium or arena by computer-controlled cable driven system. The cameras 104, 106 each provide a video output signal on lines 110, 112, respectively, to Video Production Logic 120, which conditions or adjusts the received video signals for broadcast, and selects the desired output video signal to be broadcast to viewers or recorded for future viewing on a line 122, such as Is described in commonly-owned U.S. Pat. No. 9,699,438 to Walsh, which is incorporated herein by reference to the extent necessary to understand the present disclosure. Such conditioning or adjustment may include inserting desired graphics onto the field 102, e.g., line of scrimmage graphic 130 (shown as dashed lines), or first down marker line graphic 132 (shown as dashed lines). The Video Production Logic 122, may also receive video signals from other cameras on lines 114 provide images of other views of the field 102.

The Video Production Logic 122 may also receive parameters or images, such as camera parameters (for camera tracking), or field images without occlusions, or other parameters, on a line 124 from an Image/Data Inference Server, discussed hereinafter with FIG. 2, which enable the desired graphics to be inserted into the image to be broadcast or recorded.

Referring to FIG. 19, an aerial view 100 of a football field 102 of FIG. 1A is provided with various occlusions on the field, such as offensive football players 150 (shown as "O"s), defensive football players 152 (shown as "X"s), a football 154, a field judge 156 (shown as circle F), and line judge 158 (shown as circle L), many of which are in the field of views 105, 109 of the cameras 104, 106, blocking a portion of the field for these cameras.

Figure 2:
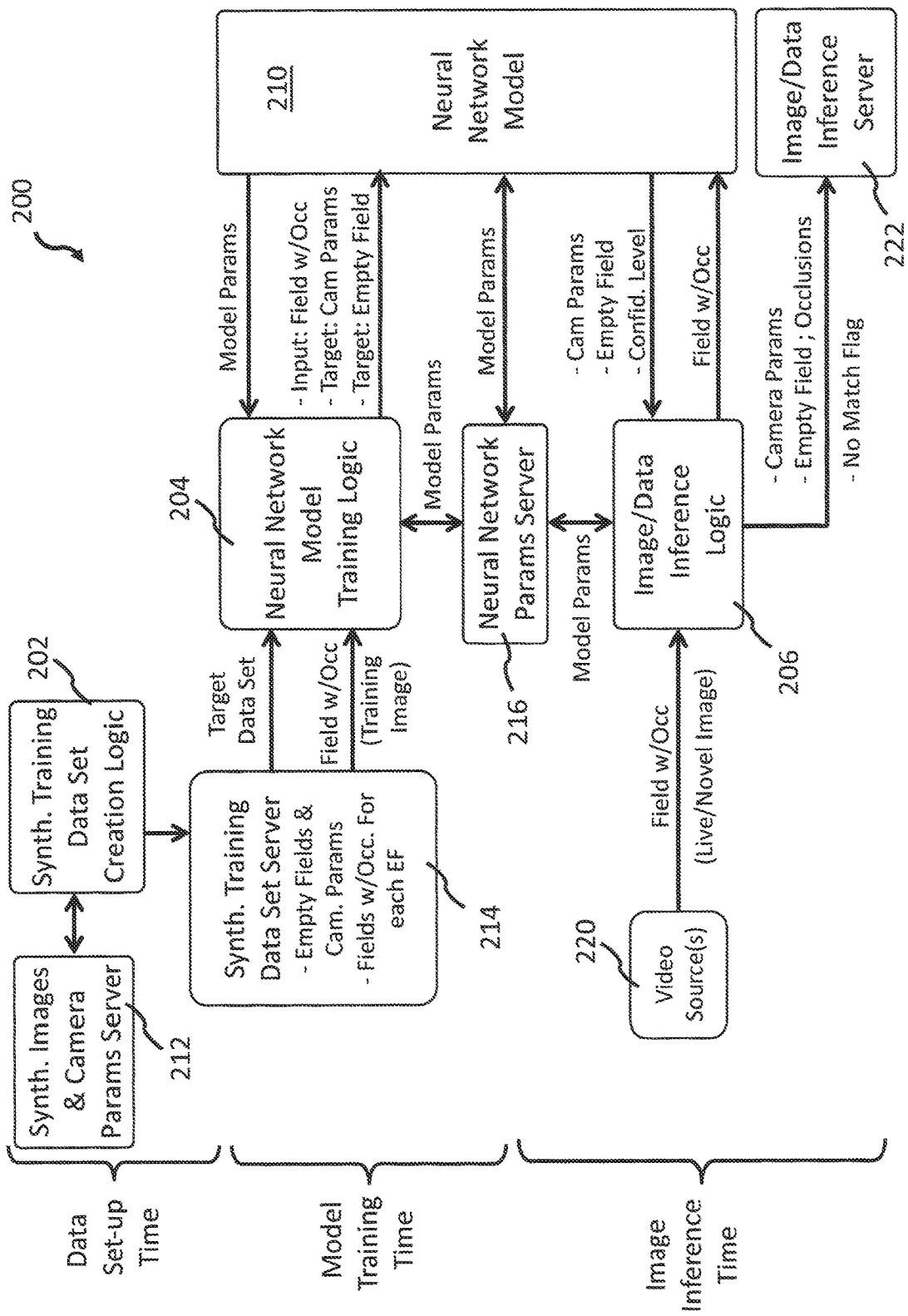
FIG. 2 is a top-level block diagram showing components of a system for robust model-based camera tracking and image occlusion removal, in accordance with embodiments of the present disclosure.

FIG. 2 illustrates various components (or devices or logic) of a system and method for robust model-based camera tracking and image occlusion removal, which includes Synthetic Training Data Set Creation Logic 202, Neural Network Model Training Logic 204, Image/Data Inference Logic 206, and a Neural Network Model 210. The diagram also shows time periods, e.g., Data Set-up Time, Model Training Time, and Image Inference Time, where certain portions of the system or method may be performed. At Data Set-up Time, the Synthetic Training Data Set Creation Logic 202 retrieves random synthetic images (with and without occlusions) and corresponding camera parameters, to create a Synthetic Training Data Set, which is saved on a Synthetic Training Data Set Server 214. At Model Training Time, the Neural Network Model Training Logic 204 receives an image of a synthesized or training image of a field with occlusions and retrieves data from the training data set and provides this data to a Neural Network Model 210, which provides estimated output parameters, including the estimates for the Camera Parameters and the Field without Occlusions (Empty Field). The Neural Network Model Training Logic 204 determines if the estimated output value is close enough to the known training set answer and if not, adjusts neural model parameters and checks the output results until the output is acceptably close to the known answers, at which time the training is complete for that input image and the model parameters are saved in a Neural Network Parameters Server 216, and the logic 204 repeats the process until all the training images have completed training the model to the desired accuracy.

At Image Inference Time, the Image/Data Inference Logic 206, receives a live input image from one or more video source(s) 202, such as an on-field video camera viewing a sporting event, e.g., from on-field cameras 104 or 106 (FIG. 1A) directly or via the production logic 120, and provides the image to the Neural Network Model 210 with the current Model Parameters retrieved from the Neural Network Parameters Server 216. The Neural Network Model 210 provides three estimated output items to the Image/Data Inference Logic 206, Camera Parameters, Field image without Occlusions (Empty Field image), and a Confidence Level or Metric (CL). The Confidence Level or Metric value is indicative of the level of confidence the model 210 has in the estimated output values. In some embodiments, the Confidence Level or Metric (CL) may have a range of 0 to 1.0, where 0 is the lowest confidence and 1.0 is highest confidence, discussed more hereinafter with FIG. 3A. Also, there may be separate Confidence Levels for each of the outputs, e.g., Camera1 Parameters and Empty Field Image, or a single combined Confidence Level. If the Confidence Level (CL) meets the desired level, the output parameters are provided to the Image/Data Inference Server 222. If not, the logic 206 obtains another image from another live camera source and repeats the process until the desired confidence level is obtained, or a "No Match" flag is set and saved in the Image/Data Inference Server 222.

In some embodiments, instead of setting-up a training data set in advance and storing all the synthesized camera parameters and images with and without occlusions, the data set (or a portion thereof) may be created in real-time when needed during Model Training Time. In that case, the Neural Network Model Training Logic 204 may call or request or invoke the Synthesized Training Data Set Creation Logic to obtain a new training data value for synthesized Camera Parameters and corresponding synthesized images with and without occlusions, each time it needs a new set of data. In either case, the model training should be completed with a full set of Model Parameters before Image Inference Time when the Model Parameters are needed by the Image/Data Inference Logic.

Figure 3A:
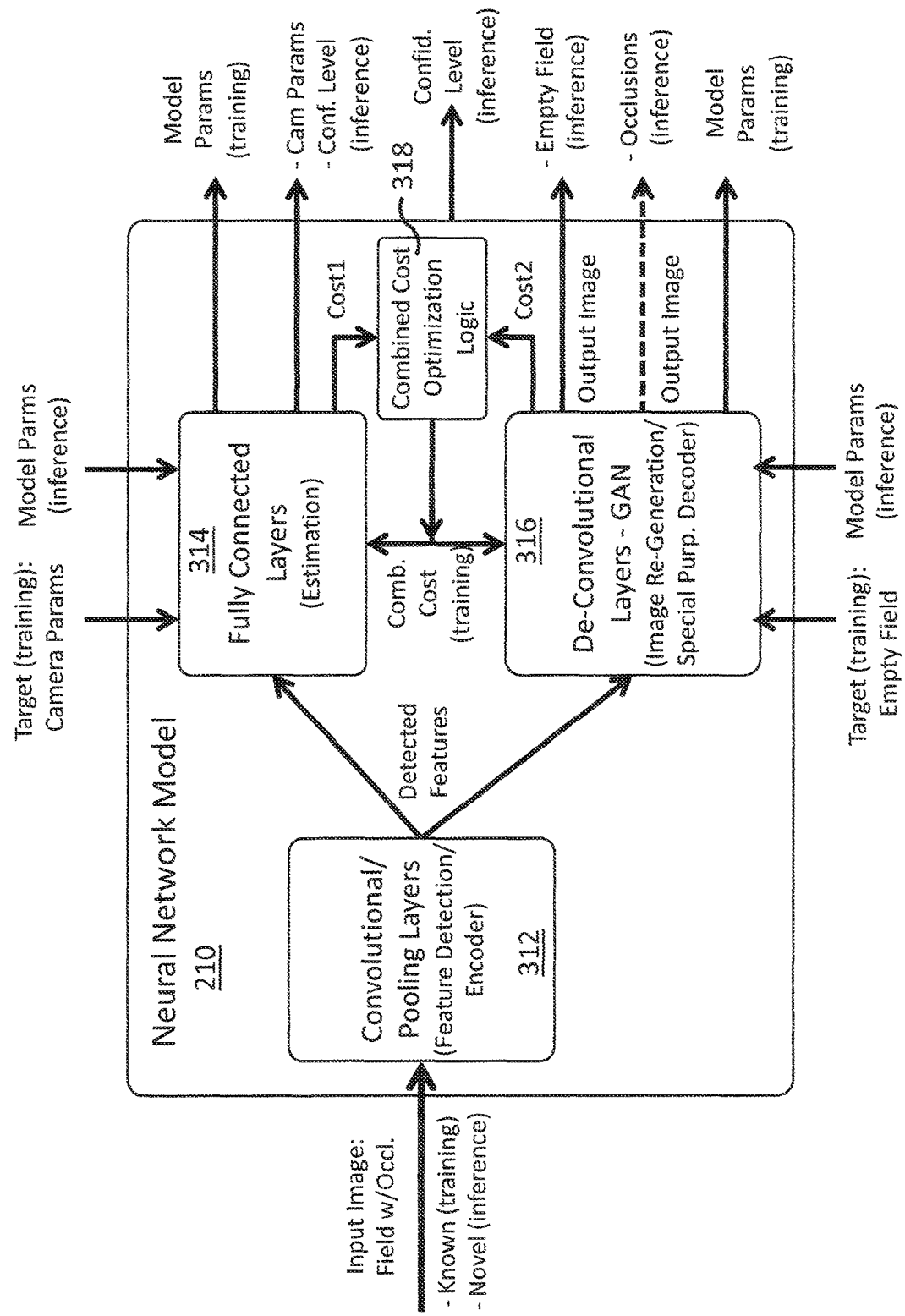
FIG. 3A is a top-level block diagram showing components of a Neural Network Model of FIG. 2, in accordance with embodiments of the present disclosure.

FIG. 3A illustrates various components (or devices or logic) of the system and method of FIG. 2 for the Neural Network Model 210. In particular, the Neural Network Model 210 may include Convolutional/Pooling Layers (or Feature Detector/Encoder) 312, which receives an Input Image of the Field with Occlusions and provides Detected Features as an output. In general, convolutional neural networks, as is known, are a type of neural network that has a plurality of convolutional layers, which specialize in image recognition and computer vision tasks. In the present disclosure, the Convolutional/Pooling Layers (or Estimator) 312 of the Neural Network Model 210 transforms the raw pixel information of the input image into a latent space representation by acting as feature detectors, turning on or off depending on the presence or absence of visual features in the input. Neurons in the initial layers are trained to activate for low-level features like "edges" and "corners", whereas neurons in the final layers would respond to larger features like yard-line markings in football, penalty arcs in soccer, and the like.

More specifically, as is known, Convolutional/Pooling Layers (or Feature Detector/Encoder) 312 comprise a convolutional layer paired with a pooling layer, which may repeat in series several times. The convolutional layer acts like a filter over the image, scanning a few pixels at a time and creating a feature map that predicts the class to which each feature belongs, and the pooling layer (or down-sampling or sub-sampling) reduces the amount of information in each feature map from the prior convolutional layer while maintaining the most important information. There are typically several rounds of convolution and pooling that occurs to provide the desired output size for the Detected Features.

The Convolutional/Pooling Layers (Feature Detector/Encoder) 312 provide the Detected Features output parameters to the Fully Connected Layers (Estimator) 314, which combine the Detected Features from the Convolutional/Pooling Layers 312 and applies weighting factors to estimate the macro-level parameters that represent the input image. In traditional image classification, these parameters would typically be labels like 'cat', 'dog', 'plane' etc. In the present disclosure, however, these are the camera parameters such as location, orientation, field-of-view, and the like. More specifically, the present disclosure uses supervised machine learning to provide estimated values, not discrete answers or labels or classifications. The present disclosure performs continuous regression (e.g., square root of the sum of the squares, or the like), to provide an estimated output value that drives the result error or model error (i.e., the difference between desired target value and actual output value) to zero or a minimum value.

At training time, the known camera parameters for each image are used to train the layers and become the targets. More specifically, the Detected Features output of the Convolution/Pooling Layers 312 are flattened by the Fully Connected Layers 314 into a single vector, each value representing particular target camera parameter. The input values of the Fully Connected Layers 314 flow into a first layer of neurons and are multiplied by weights and pass through an "activation function", e.g., ReLu (rectified linear unit), sigmoid, tan h, step function, or the like, as is known, as in a classic artificial neural network, which determines (and normalizes) the output of each neuron in the network. Then, they may pass through several (e.g., more than two) hidden neuron layers for deep learning, as is known, and then pass to an output layer in which every neuron represents a target value to be estimated.

The Fully Connected Layers 314 perform a known iterative (or "back-propagation") process or logic to determine the most accurate weights and each neuron receives a weight that prioritizes the most appropriate target value. Such back-propagation may also be referred to as an iterative cost function optimization process or logic (or Cost1 optimization logic—not shown). In particular, the Fully-Connected Layers 314 may provide a Cost function output value, Cost1, indicative of how far the estimated output values of the Fully-Connected Layers 314 differs from the desired target values. In particular, Cost1 is indicative of the error between the Target Camera Parameters and the estimated Camera Parameters (during training). The Cost1 optimization logic adjusts the parameters to drive the cost function to zero or a minimum value. The resulting weights or model parameters for the neural network model are saved, e.g., in the Neural Network Params Server 216, for use at inference time. The Cost1 output value may also be provided to the Comb. Cost Optimization Logic 318 (FIG. 3A), discussed hereinafter.

The Convolution/Pooling Layers 312 and the Fully Connected Layers 314 together may be referred to as a Convolutional Neural Network (or CNN), as is known to those skilled in the art of neural networks, such as is described in: https://towardsdatascience.com/a-comprehensive-guide-to-convolutional-neural-networks-the-eli5-way-3bd2b1164a53; and https-J/missinglink.aVguides/convolutional-neural-networks/fully-connected-layers-convolutional-neural-networks-complete-guide/, each of which are incorporated herein by reference to the extent necessary to understand the present disclosure.

The Convolution/Pooling Layers (Feature Detector/Encoder) 312 also provide the Detected Features to De-Convolutional Layers 316, which may be implemented by a type of Generative Adversarial Network (GAN) or a Special Purpose Image Decoder (SPD) 316 (or Image Generator or Image Re-generator). The De-Convolutional Layers (or GAN or SPD) 316 does the opposite of the Convolutional/Pooling Layers 312. Starting with the Detected Features at the output of the convolutional/pooling layers 312, the De-convolutional Layers 316 re-build (or re-construct or re-generate) the original input image without any occluding object or players. Such re-generation may be done using a Generative Adversarial Network (GAN) or a Special Purpose Image Decoder (SPD), discussed more hereinafter with FIG. 3B.

Figure 3B:
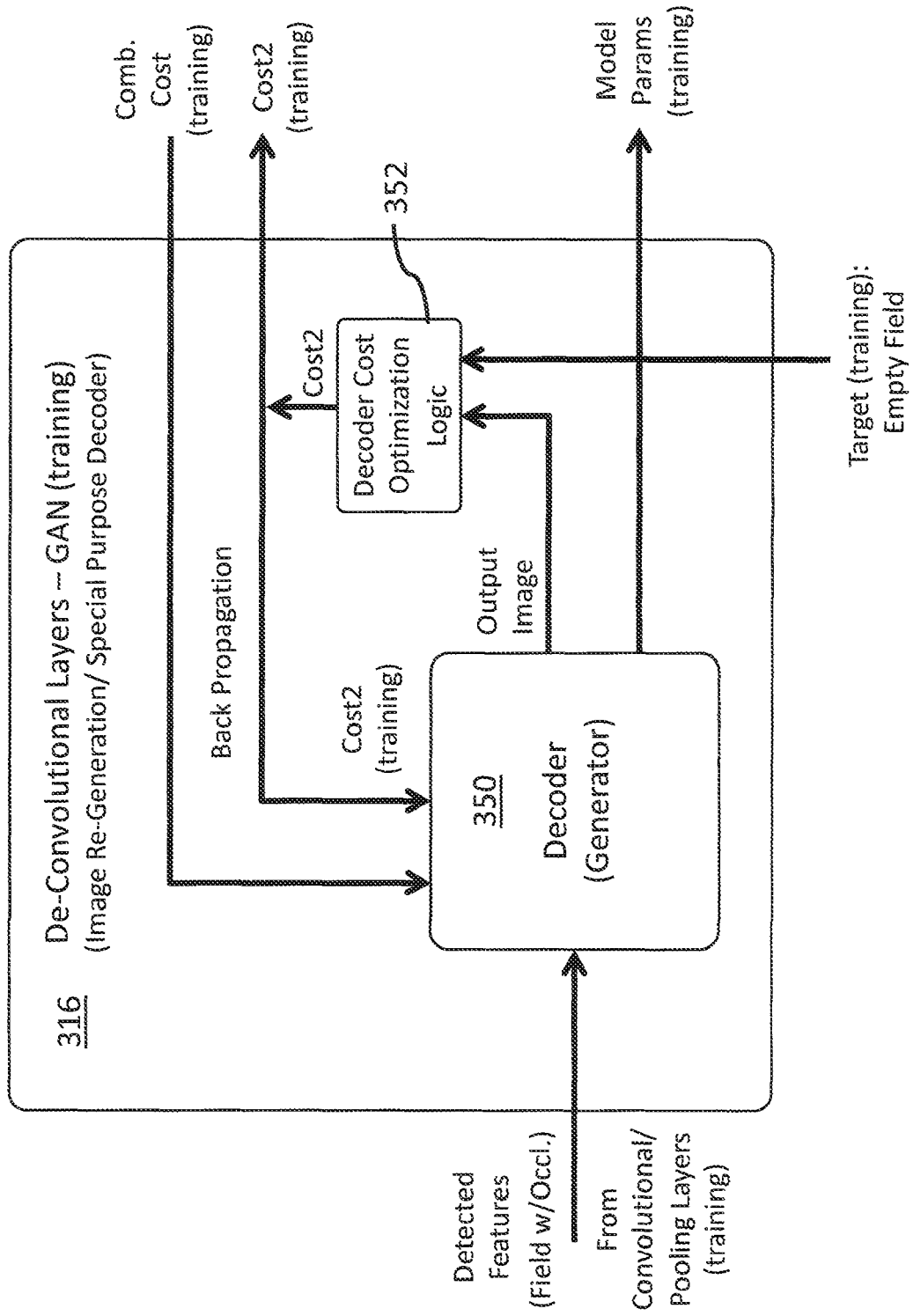
FIG. 3B is a block diagram showing components of a GAN/Special Purpose Decoder of FIG. 2, in accordance with embodiments of the present disclosure.

Referring to FIG. 3B, more specifically, the image without occlusions is generated by a unique form of Generative Adversarial Network (GAN) or Special Purpose Image Decoder (SPD), where the occlusions have been removed, and intelligently "filled-in" to recreate the background scene or empty field. The network model, during training, learns to ignore the occluding objects on the field, as it generates an empty field image (image without occlusions).

A typical Generative Adversarial Network (GAN), as is known, takes in an unknown input image and a training input image and generates an image through iterative processing, which results in a matching image to the training image. Part of a typical Generative Adversarial Network (GAN) may include a general image decoder (e.g., as part of an image encoder/decoder combination), as is known to those skilled in the art of neural networks, such as is described in: https://wiki.pathmind.com/generative-adversarial-network-gan, which is incorporated herein by reference to the extent necessary to understand the present disclosure.

However, the present disclosure uses a new type of image decoder, the Special Purpose Decoder (SPD) 316, which uses a known image decoder 350 with iterative back-propagation added (similar to that discussed herein with the Fully Connected Layers 314) and may also be referred to as an iterative cost function optimization process or logic shown as Decoder Cost Optimization Logic 352. In particular, the Decoder Cost Optimization Logic 352 may provide a cost function value, Cost2, indicative of how far the estimated output image of the Decoder 350 differs from the desired target image (i.e., the model error). In particular, Cost2 may be indicative of the error between the Target Empty Field Image and the estimated Empty Field Image (during training). The Cost2 value may be provided back to the Decoder logic 350 to adjust the model parameters to drive the cost function to zero or a minimum value. The resulting weights or model parameters for the Special Purpose Detector 316 are saved, e.g., in the Neural Network Params Server 216, for use at inference time. The Cost2 output value is also provided to the Comb. Cost Optimization Logic 318 (FIG. 3A), discussed hereinafter.

Referring back to FIG. 3A, to further optimize the results of the supervised machine learning neural network model 210 training, the Cost function output values Cost1 from the Fully-Connected Layers 314 and the Cost function output value Cost2 from the De-convolution Layers (GAN/SPD) 316 may be fed to a Combined Cost Function Optimization Logic 318, which determines a combined cost function output (Comb. Cost). The Comb. Cost output may be provided to (or fed-back to) both the Fully-Connected Layers 314 and De-convolution Layers (GAN/SPD) 316 for further iterative optimization (or back-propagation) of the model training to drive the cost (or error) of both model portions to an optimized or minimized result. Such Comb. Cost function feedback forces the results of both portions of the model to be connected or coupled or linked together, such that the Neural Network Model 210 drives the results to one set of Camera Parameters and corresponding Empty Field Image. In some embodiments, the Comb. Cost value may be part of (or combined with) the Cost1 and Cost2 values that make up the iterative back-propagation performed by the Fully-Connected Layers 314 and the De-convolution Layers (GAN/SPD) 316, respectively.

As is known in the art of neural networks and discussed herein, a Cost function is a numerical measure of how far the estimated output of the network model differs from the target output (during model training). In the present disclosure, the Combined Cost function (Comb. Cost) may be calculated as the sum of the two cost functions Cost1 (Camera Parameters cost) and Cost2 (regenerated Empty Field Image cost), as shown below:

$$\text{Comb. Cost} = \text{Cost1} + \text{Cost2} \qquad \text{Eq. 1}$$

where:

Cost1=SQUARE_ROOT of (Sum of squares of individual Camera Parameter value differences); and where:

Sum of squares of individual parameter differences=square(X'−X)+square(Y'−Y)+square(Z'−Z)+square(elev'−elev)+square(azi'−azi)+square(roll'−roll)+square(fov'−fov), where the primed (') variables refer to the estimated output value of the model and the non-primed variables are the target values; and Cost2 (for full color image)=SQUARE_ROOT of (Sum of squares of individual pixel color value differences);

Where (for full color image): Sum of squares of individual pixel color value differences=Sum of squares of individual pixel R (red channel) value differences (Sum_R)+Sum of squares of individual pixel G (green channel) value differences (Sum_G)+Sum of squares of individual pixel B (blue channel) value differences (Sum_B); and Cost2 (for greyscale image)=SQUARE_ROOT of (Sum of squares of individual pixel grayscale value differences).

For example, if the image is of size: number of rows=H and number of columns=W, then, denoting i for rows and j for columns, the Sum of squares of all the individual pixels in the image for each color channel (for full color image) may be calculated as shown below in software code format:

Sum_R=0; Sum_G=0; Sum_B=0
For i=1 to H do . . .
  For j=1 to W do . . .
    Sum_R=Sum_R+square(Rvalue'[i,j]−Rvalue[i,j])
    Sum_G=Sum_G+square(Gvalue'[i,j]−Gvalue[i,j])
    Sum_B=Sum_B+square(Bvalue'[i,j]−Bvalue[i,j]);

and where the Sum of squares of all the individual pixel greyscale value differences (for greyscale image) may be calculated as shown below in software code format:

Sum_gray=0
For i=1 to H do . . .
  For j=1 to W do . . .
    Sum_gray=Sum_gray+square(gray_value'[i,j]−gray_value[i,j])

where the primed (') variables in the above example refer to the estimated output value of the model and the non-primed variables are the target values.

In some embodiments, the supervised machine learning neural network model 210 training process of the present disclosure provides two outputs: (i) camera parameters (external and internal) and (ii) an image of the field (background) without occlusions (empty field). The image without occlusions is generated by the GAN/Special Purpose Decoder described further herein, in which the occlusions in the image have been removed, and intelligently "filled-in" to recreate the scene or empty field. The network, during training, learns to ignore the occluding objects on the field, as it generates an empty field image (image without occlusions).

At training time, the system of the present disclosure receives, provides or synthesizes (or generates) a pair of computer generated images for a given set of computer generated Camera Parameters: an empty field image without any occlusions (Empty Field image); and the Empty Field image with occlusions (players, and the like) (Field with Occlusions). The input image (Field with Occlusions) is provided to the input of the Convolutional/Pooling Layers 314. The Camera Parameters used to generate (or corresponding to) the Empty Field Image is the Target data for the output of the Fully Connected Layers 314. The Empty Field image (Field without Occlusions) is the Target image for the output of the De-convolutional Layers 316.

At inference time (or testing time), a novel or new image is applied at the input of the Convolutional/Pooling Layers 312 and the model 210 is run with the model parameters obtained from the model training, and the predicted Camera Parameters are available at the output of the Fully Connected Layers 314 and the predicted Empty Field image (without occlusions) is available at the output of the GAN/SPD de-convolutional layers 316.

Referring back to FIG. 3A, at inference time, the Neural Network Model 210 may also provide a Confidence Level or Metric (CL). As discussed herein above, the Confidence Level or Metric value is indicative of the level of confidence the model 210 has in the estimated output values. For example, the Confidence Level or Metric (CL) may have a range of 0 to 1.0, where 0 is the lowest confidence and 1.0 is highest confidence. Other values and ranges for the Confidence Level (CL) may be used if desired.

The Confidence Level or Metric (CL) may be implemented using various techniques to measure the confidence of the output of the Neural Network Model, as described below. As the Neural Network Model 210 uses supervised machine learning with regression calculations (rather than classification), the Confidence Level (CL) measurement technique used are those designed for use with regression problems. Other techniques than those described below may be used to provide the Confidence Level or Metric (CL) herein, provided it provides the desired function.

In some embodiments, the following techniques may be used for measuring a Confidence Level or Metric or Interval for the estimated Camera Parameters. For a given input, the model parameters give a particular set of outputs. For the same input, the model is then modified, either by altering its network connections ("dropouts" technique) or by sampling the parameters from a distribution (Bayesian regression technique) and then the output is estimated and recorded. This process is repeated a number of times (the number of times to repeat depends on the time allowed in the process pipeline, since the total time to process increases with each iteration). This set of outputs gives a 'spread' or 'distribution'. A Confidence Level or Interval or Metric may be determined based on the extent of the spread between the maximum and minimum values in the output. The model typically performs best where the Confidence Level or Interval or Metric is the smallest or where the spread is the shortest and vice-versa.

In some embodiments, the neural network connections in the Neural Network Model 210 may be altered by using "dropouts". In this case, the model randomly shuts down or removes neurons in the neural network model to prevent the model from overfitting to samples provided in the training set. This technique allows the model to be more generalized and be more robust. Such dropouts are turned on (or enabled) and used at inference time for the regression based models described herein to provide confidence intervals. The model may be evaluated multiple times with dropouts enabled to get a spread of output values for the same input.

Another technique may use a Bayesian Regression technique, where, instead of doing a point (or single-valued) estimation as is usually done in regression, the model estimates a "distribution" of points. In that case, the true answer of the output values is to be found (or sampled from) a distribution or "spread" of such output values. Also, in that case, it is assumed that the model parameters that are to be learned during training also follow a distribution, and the true value of the parameters is in the neighborhood of (or be sampled from) a distribution of values. In some embodiments, sampling from this distribution (assuming a gaussian distribution) may be performed by taking the parameters derived from a maximum likelihood approach (back-propagation and gradient descent) and having that be the mean (or average) and then sample from that neighborhood of values.

Figure 3C:
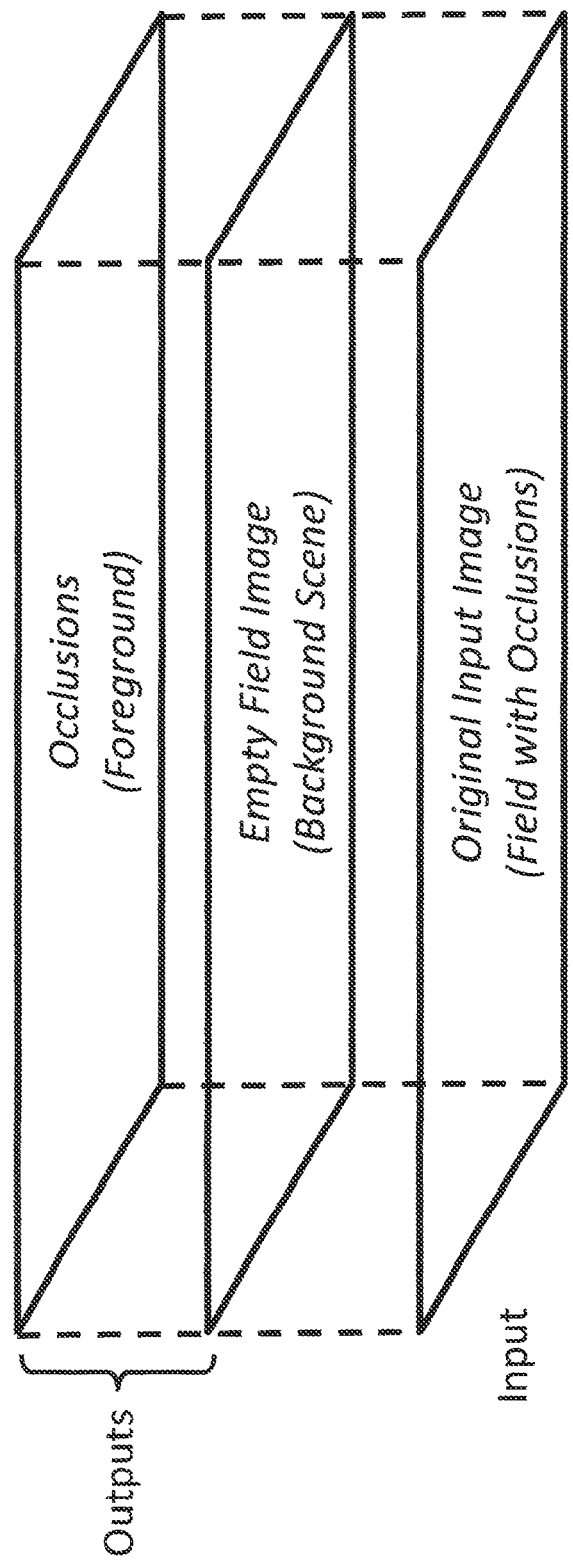
FIG. 3C is a diagram showing image segmentation layers including background scene with occlusions, background scene, and foreground on different layers, in accordance with embodiments of the present disclosure.

Referring to FIG. 3C, in some embodiments, the GAN/SPD layers 316 may also provide an output image of the Occlusions by themselves, such as that shown as Occlusions—foreground layer. This may be provided by having obtained the Empty Field Image, and having the input Field with Occlusions image, and applying a logical operation between the two images to obtain an image of the Occlusions alone.

Such image generation may be viewed as a form of image segmentation, where an input image (Field with Occlusions), e.g., a live image from a sports game or other live scene or other input image, is segmented into two images or layers, an image of the Empty Field (without Occlusions) and an image of the Occlusions (without the underlying field), such as is shown in the image segmentation diagram of FIG. 3C. Such segmentation into these images (or layers) may be useful for certain graphic insertions or digital image manipulations.

Referring to FIGS. 4, 5A, 5B, 5C, a flow diagram 400 (FIG. 4) illustrates one embodiment of a process or logic for implementing the Synthesized Training Data Set Creation Logic 202 (FIG. 2). The process 400 begins at block 402 which retrieves a random Empty Field Camera View image from a Random Synthetic Empty Field Images (EF) Table 500, shown in FIG. 5A, which contains (or points to) a plurality (M) of Empty Field Camera View Images (or Empty Field Images or EF Images), having image names e.g., CV1 to CVM, stored in file names CV1.png to CVM.png, and also contains camera parameters (P1-P7) corresponding to each EF image. The Camera Parameters may include camera location (X,Y,Z), orientation (elevation, roll, azimuth) angles, field-of-view or focal length, and (optionally) optical distortion (radial and tangential). Next, block 404 saves the Empty Field Image and Camera Parameters in a Synthesized Training Data Set (STDS) Table 550, shown in FIG. 5C. Next, block 406 retrieves a Random Occlusion Graphic from a Random Synthetic Occlusion Graphic (or OG) Table 530, shown in FIG. 58, which contains (or points to) a plurality (N) of Occlusion Graphic Images, having graphic image names e.g., OG1 to OGN, stored in file names OG1.png to OGN.png. The occlusion graphic images may be images of sports players, referees/officials, balls/sports objects, fans/spectators, and the like, associated with a particular sport related to the Empty Field Images of FIG. 5A. The block 406 also adds or inserts the selected Occlusion Graphic image into the current Empty Field image. Next, block 408 saves the inserted Occlusion Graphic image and the combined Field image with Occlusions in the in the corresponding columns of the STDS Table 550 (FIG. 5C). Next, block 410 determines if all the Occlusions have been added to the current Empty Field image. If No, block 412 updates a pointer to the next Occlusion Image and the logic proceeds to back to block 406 which retrieves the next Random Occlusion Graphic image from the OG Table 530 (FIG. 5B). If the result of block 410 is Yes, all Occlusion Graphics have been added to the current EF image, and block 414 determines if all the EF images have been completed. If No, block 416 updates a pointer to the next Empty Field Image and the logic proceeds to back to block 402 which retrieves the next EF Image from the EF Table 500 (FIG. 5A). If the result of block 414 is Yes, all EF Images have had the full set of occlusions added, the STDS Table 550 (FIG. 5C) is complete, and the logic exits.

Referring to FIG. 6, a flow diagram 600 illustrates one embodiment of a process or logic for implementing the Neural Network Training Logic 204 (FIG. 2). The process 600 begins at block 602 which retrieves an Input Training Image (Field with Occlusions) from the Synthesized Training Data Set (STDS) Table 550 (FIG. 5C). Next, block 604 retrieves a Target Data Set for the input Training Image, which includes the corresponding Camera Parameters and Empty Field Image, i.e., the known target data. Next, block 608 runs the Neural Network Model 210 (FIG. 2 and FIG. 3), with the selected input Training Image and the corresponding Target Data Set (i.e., Camera Parameters and Empty Field Image that correspond to the Training Image). For example, referring to the STDS table 550 (FIG. 5C), if the first Training Image (Field with Occlusion Graphic Image) is CV1-OG1-1, the corresponding Target Data Set would be the Empty Field Image CV1 and the Camera Parameters P1-1 to P7-1.

Next, block 610 determines whether the Training of the model for the current Training Image is completed, i.e., has the model iterated to a desired solution. If No, the model adjusts the model parameters in block 612 and continues to run the model at block 608. If the result of block 610 is Yes, the training of the model is complete for the current input Training Image and the logic proceeds to block 614, which determines if the training is complete for all desired training images. If No, block 616 updates a pointer to the next Training Image and the logic proceeds to back to block 602 which retrieves the next Input Training Image (Field with Occlusions) from the Synthesized Training Data Set (STDS) Table 550 (FIG. 5C), and the process repeats for the next Training Image. If the result of block 614 is Yes, model training is complete for all desired Training Images and block 618 saves the Neural Network Model parameters to the Synthesized Training Data Set (STDS) Table 550 (FIG. 5C), and the logic exits.

Referring to FIG. 7, a flow diagram 700 illustrates one embodiment of a process or logic for implementing the Image/Data Inference Logic 206 (FIG. 2). The process 700 begins at block 702 which retrieves an Input Live Image (Field with Occlusions), e.g., from an on-field video camera, e.g., camera 104 (FIG. 1A). Next, block 704 runs the Neural Network Model 210 (FIG. 2 and FIG. 3), with the selected live input Image and receives the Camera Parameters and Empty Field image outputs as well as the Confidence Level or Metric (CL) for each output. The block 704 also optionally determines or calculates an Occlusions image (without the Field in background) as discussed herein.

Next, block 706 determines if the Confidence Level (CL) is acceptable, e.g., greater than 0.9 for the outputs of interest. In that case, the Confidence Level may have a range of 0 to 1.0, where 0 is the lowest confidence and 1.0 is highest confidence. If the result of block 706 is No, block 708 checks if all available cameras have been checked. If No, block 710 updates a pointer to the next Camera and the logic proceeds to back to block 702 which retrieves a live input video signal from the next available on-field camera and the logic repeats. If the result of block 708 is Yes, all available cameras have been checked and block 712 sets a No Match Flag=1, indicating that there is not an acceptable match or inference value or image that can be used for graphics insertion into the broadcast video feed.

If the result of block. 706 is Yes, the Confidence Level (CL) for the output parameters are at an acceptable level and block 714 sets the No Match Flag=0, indicating that there is an acceptable match or inference value or image that can be used for graphics insertion into the broadcast video feed. Next, block 716 saves the Not Match Flag, Camera Parameters, Empty Field Image, and Occlusions image (if used), to the Image/Data Inference Server 222 and the logic exits.

Referring to FIG. 8, a sample Synthesized Training Data Set is shown having 11 Empty Field camera view images CV1 to CV11, and showing the corresponding Camera Parameters P1-P7, where parameters P1-P3 correspond to camera location (X, Y, Z), parameters P4-P6 correspond to camera orientation (elevation, roll, azimuth), and parameter P7 corresponds to Field of View (fov). In some embodiments, there may be additional or other Camera Parameters, such as optical distortion (radial and tangential), or other camera parameters, if desired. The values in table 800 are normalized to be from −1 to +1, for use with the neural network model; however, the values may be converted to actual real-world values as follows:

For Elevation values: add 1.0 and multiply by 90;
For Roll and Azimuth values: multiply by 90;
For FOV values: Add 1.0 and multiply by 90; and
For X, Y, Z Location values: Multiply by 75 (feet)

Figure 9A:
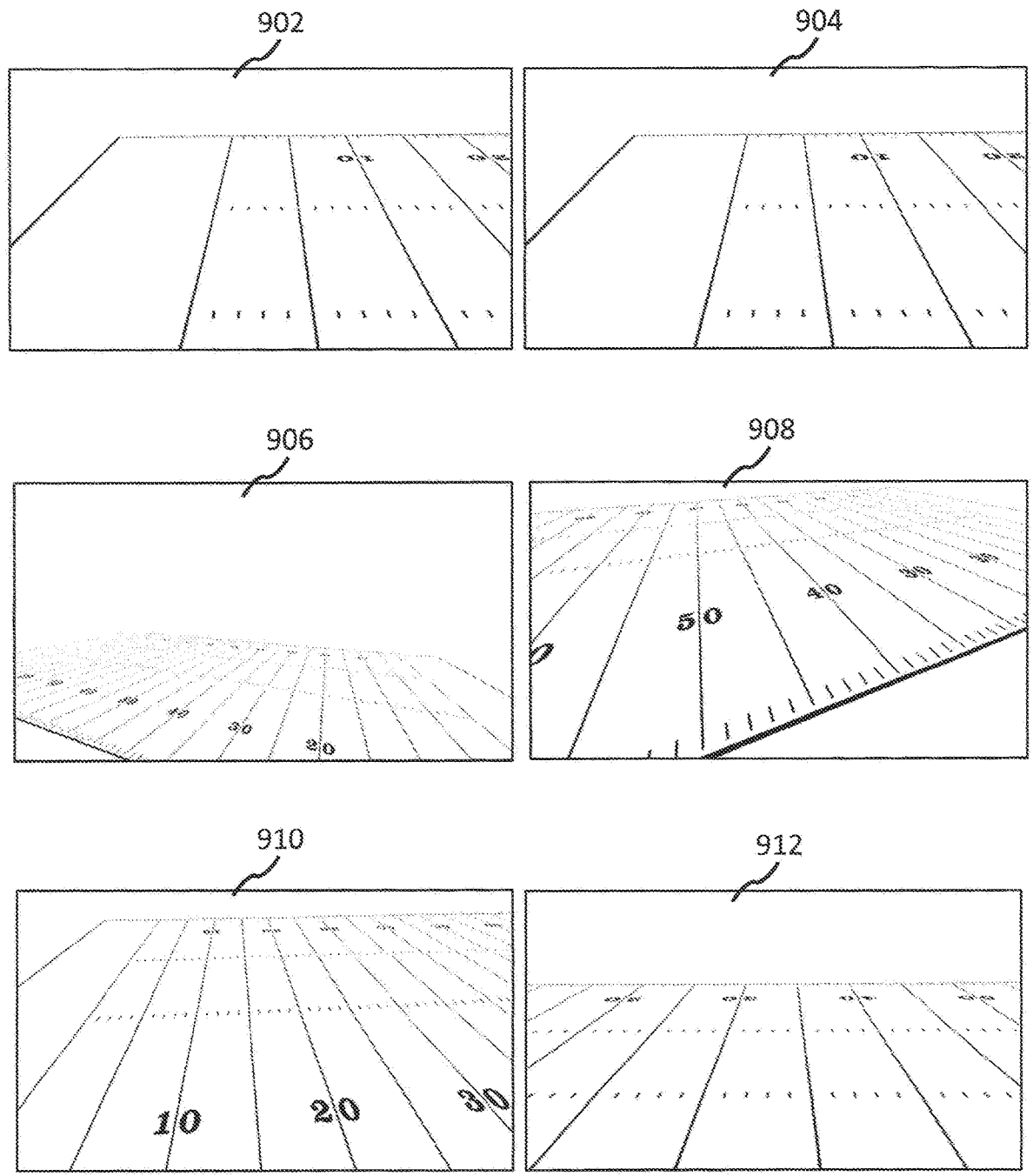
FIGS. 9A and 9B show different views of random synthetic empty field images corresponding to camera parameters shown in the table of FIG. 8, in accordance with embodiments of the present disclosure.
Figure 9B:
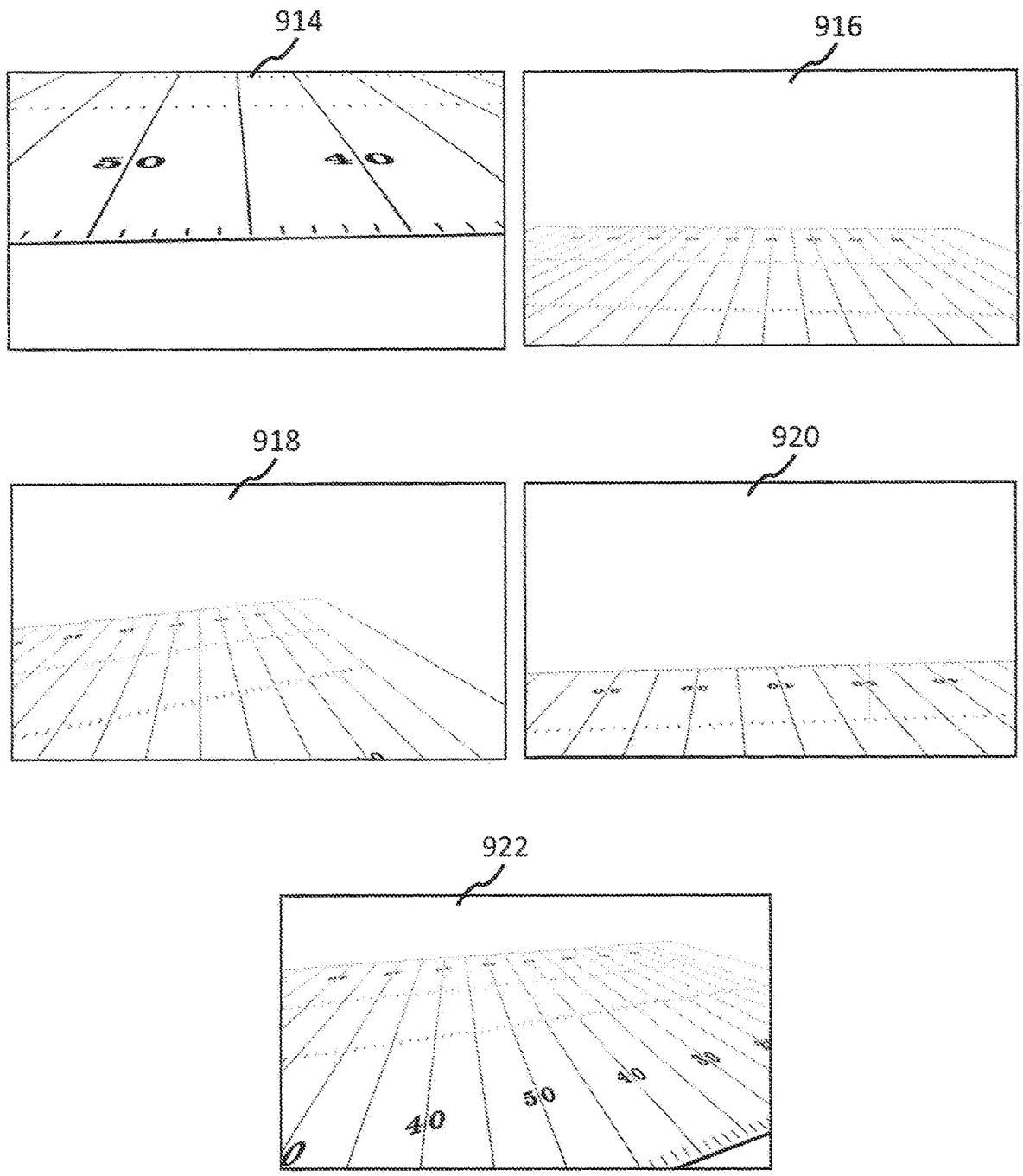

Referring to FIGS. 9A and 9B, which shows different views of random synthetic empty field images 902, 904, 906, 908, 910, 912, 914, 916, 918, 920, and 922, corresponding to camera parameters shown in the table of FIG. 8 for CV1, CV2, CV3, CV4, CV5, CV6, CV7, CV8, CV9, CV10, and CV11, respectively, in accordance with embodiments of the present disclosure.

Figure 10:
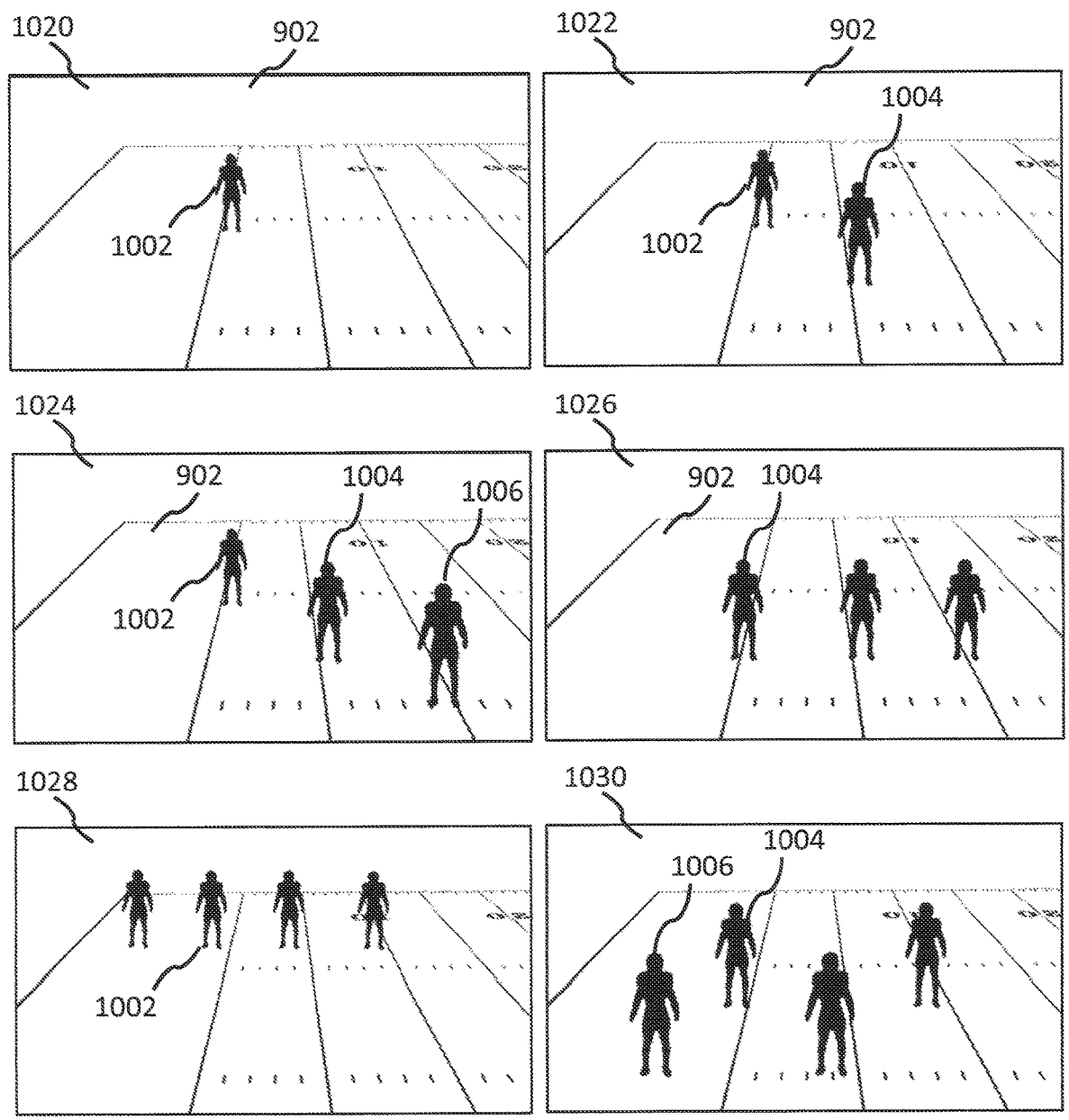
FIG. 10 shows a plurality of images each having a different occlusion graphic inserted into an Empty Field image of FIG. 9A, in accordance with embodiments of the present disclosure.

Referring to FIG. 10, which shows the background Empty Field image 902 of FIG. 9A, with a plurality of different occlusion graphic images inserted into the Empty Field image 902, in accordance with embodiments of the present disclosure. In particular, FIG. 10 shows the Empty Field image 902 with a single football player image 1002 added to the Empty Field image 902, to create a Field with Occlusion image 1020. Similarly, the Empty Field image 902 is combined with a two football player images 1002, 1004 added to the Empty Field image 902, to create a Field with Occlusion image 1022. Similarly, the Empty Field image 902 is combined with three football player images 1002, 1004, 1006 added to the Empty Field image 902, to create a Field with Occlusion image 1024. Similarly, the Empty Field image 902 is combined with three football player images 1004 added to the Empty Field image 902, to create a Field with Occlusion image 1026. Similarly, the Empty Field image 902 is combined with four football player images 1002 added to the Empty Field image 902, to create a Field with Occlusion image 1028. Similarly, the Empty Field image 902 is combined with four football player images 1004, 1006 added to the Empty Field image 902, to create a Field with Occlusion image 1030.

Referring to FIG. 11, which shows the plurality of different occlusion graphic images from FIG. 10, images 1020 to 1030, with no background field image (or the background field removed), to create Occlusion-only Images 1020A, 1022A, 1024A, 1026A, 1028A, 1030A, in accordance with embodiments of the present disclosure.

In some embodiments, the processing described herein may be performed using full color (R,G,B) or greyscale images, and the training data would correspond to the image type used. In the case of greyscale, the Video Production Logic 120 (in FIG. 1A) may have logic that performs conversion to a greyscale representation of the video camera images such as by using the key output of a known chromakeying operation, if needed, before being sent to the Image/Data Inference Logic 206, or may be converted in the Image/Data Inference Logic 206, or converted in separate video pre-processing logic (not shown) before the Logic 206. The training data shown in FIGS. 9A, 9B, 10 and 11, are shown as greyscale images, i.e., the playing surface is white and anything on top of the playing surface, e.g., field markings and players, are black. Such a greyscale approach reduces the amount of information presented to the Neural Network Model 210 (and thus reduces processing complexity), and helps assure that only essential image information is retained in the video image, e.g., field markings and occlusions. However, in some embodiments, the same training data may be provided using full color training images if desired.

The system, computers, servers, devices, logic and the like described herein have the necessary electronics, computer processing power, interfaces, memory, hardware, software, firmware, logic/state machines, databases, microprocessors, communication links (wired or wireless), displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general-purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, mobile communication devices, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, functions, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for providing robust model-based camera tracking for a camera viewing a sports field, comprising:
   receiving a synthesized data set comprising at least one synthesized empty field image of the sports field, the at least one of the synthesized empty field image with at least one synthesized occlusion graphic blocking at least a portion of the field, and synthesized camera parameters corresponding to camera parameters used to generate the synthesized empty field image;
   training a neural network model to estimate the synthesized empty field image and the corresponding synthesized camera parameters by providing the model with an input training image comprising the synthesized empty field image with synthesized occlusion graphic, and providing the model with model output targets comprising the synthesized empty field image and the corresponding synthesized camera parameters as targets for the model, and, when training is complete, the model providing trained model parameters;
   receiving by the neural network model, a live input image comprising a view of the field with live occlusions blocking portions of the field; and
   providing by the neural network model, using the trained model parameters, estimated live camera parameters corresponding to camera parameters used to generate the live input image and an estimated empty field image associated with the live input image without any occlusions;
   wherein the neural network model comprises a generative adversarial network (GAN) which generates the estimated empty field image;
   wherein the neural network model comprises a first cost function associated with camera parameters cost from fully-connected layers and a second cost function associated with estimated empty field image cost from the GAN, and wherein the first cost function and the second cost function are combined into a combined cost function which is iteratively driven to an optimized result.

2. The method of claim 1, further comprising creating the synthesized data set.

3. The method of claim 1, wherein the neural network model comprises a convolutional neural network.

4. The method of claim 1, wherein the neural network model comprises a convolutional/pooling layers and fully-connected layers.

5. The method of claim 1, wherein the neural network model comprises supervised learning optimization using a cost function.

6. The method of claim 1, further comprising, switching to a different camera view when a confidence metric of the estimated live camera parameters is below a predetermined level.

7. The method of claim 1, wherein the estimated live camera parameters comprises at least one of: camera location, camera orientation, field of view, and optical distortion.

8. The method of claim 1, wherein the neural network model learns to ignore the occlusions in the input image.

9. The method of claim 1, wherein the neural network model provides segmentation of the live input image into foreground and background images, the foreground image comprising occlusions and the background image comprising the field and comprising intelligent fill of the background image in areas where the occlusions have been removed.

10. A method for providing robust model-based camera tracking and occlusion removal for a camera viewing a sports field, comprising:
  receiving a synthesized data set comprising at least one synthesized empty field image of the field, the at least one of the synthesized empty field image with at least one synthesized occlusion graphic blocking at least a portion of the field, and synthesized camera parameters corresponding to camera parameters used to generate the synthesized empty field image;
  training a neural network model to estimate the synthesized empty field image and the corresponding synthesized camera parameters by providing the model with an input training image comprising the synthesized empty field image with synthesized occlusion graphic, and providing the model with model output targets comprising the synthesized empty field image and the corresponding synthesized camera parameters as targets for the model, and, when training is complete, the model providing trained model parameters;
  receiving by the neural network model, a live input image comprising a view of the field with live occlusions blocking portions of the field; and
  providing by the neural network model, using the trained model parameters, estimated live camera parameters corresponding to camera parameters used to generate the live input image and an estimated empty field image associated with the live input image without any occlusions;
  wherein the neural network model comprises a generative adversarial network (GAN) which generates the estimated empty field image;
  wherein the neural network model comprises a first cost function associated with camera parameters cost from fully-connected layers and a second cost function associated with estimated empty field image cost from the GAN, and wherein the first cost function and the second cost function are combined into a combined cost function which is iteratively driven to an optimized result.

11. The method of claim 10, further comprising creating the synthesized data set.

12. The method of claim 10, wherein the neural network model comprises a convolutional neural network.

13. The method of claim 10, wherein the neural network model comprises a convolutional/pooling layers and fully-connected layers.

14. The method of claim 10, wherein the neural network model comprises supervised learning optimization using a cost function.

15. The method of claim 10, wherein the neural network model learns to ignore the occlusions in the input image.

16. The method of claim 10, wherein the neural network model provides segmentation of the live input image into foreground and background images, the foreground image comprising occlusions and the background image comprising the field and comprising intelligent fill of the background image in areas where the occlusions have been removed.

17. The method of claim 10, further comprising, switching to another camera view when a confidence metric of the estimated live camera parameters or the estimated empty field image is below a predetermined level.

18. A method for providing occlusion removal for a camera viewing a scene, comprising:
  receiving a synthesized data set comprising at least one synthesized empty scene image of the scene, the at least one of the synthesized empty scene image with at least one synthesized occlusion graphic blocking at least a portion of the scene, and synthesized camera parameters corresponding to camera parameters used to generate the synthesized empty scene image;
  training a neural network model to estimate the synthesized empty scene image and the corresponding synthesized camera parameters by providing the model with an input training image comprising the synthesized empty scene image with synthesized occlusion graphic, and providing the model with model output targets comprising the synthesized empty scene image and the corresponding synthesized camera parameters as targets for the model, and, when training is complete, the model providing trained model parameters;
  receiving by the neural network model, a live input image comprising a view of the scene with live occlusions blocking portions of the scene; and
  providing by the neural network model, using the trained model parameters, an estimated empty scene image associated with the live input image without any occlusions;
  wherein the neural network model comprises a generative adversarial network (GAN) which generates the estimated empty field image;
  wherein the neural network model comprises a first cost function associated with camera parameters cost from fully-connected layers and a second cost function associated with estimated empty field image cost from the GAN, and wherein the first cost function and the second cost function are combined into a combined cost function which is iteratively driven to an optimized result.

19. The method of claim 18, wherein the neural network model provides segmentation of the live input image into foreground and background images, the foreground image comprising occlusions and the background image comprising the scene and comprising intelligent fill of the background image in areas where the occlusions have been removed.

20. The method of claim 18, wherein the scene comprises a sports field.

21. The method of claim 18, wherein the providing comprises providing by the neural network model, using the trained model parameters, estimated live camera parameters corresponding to camera parameters used to generate the live input image.

* * * * *